Aug. 29, 1961 A. G. DE CLAIRE, JR 2,997,986
SERVO SYSTEM
Filed Nov. 12, 1958 3 Sheets-Sheet 2

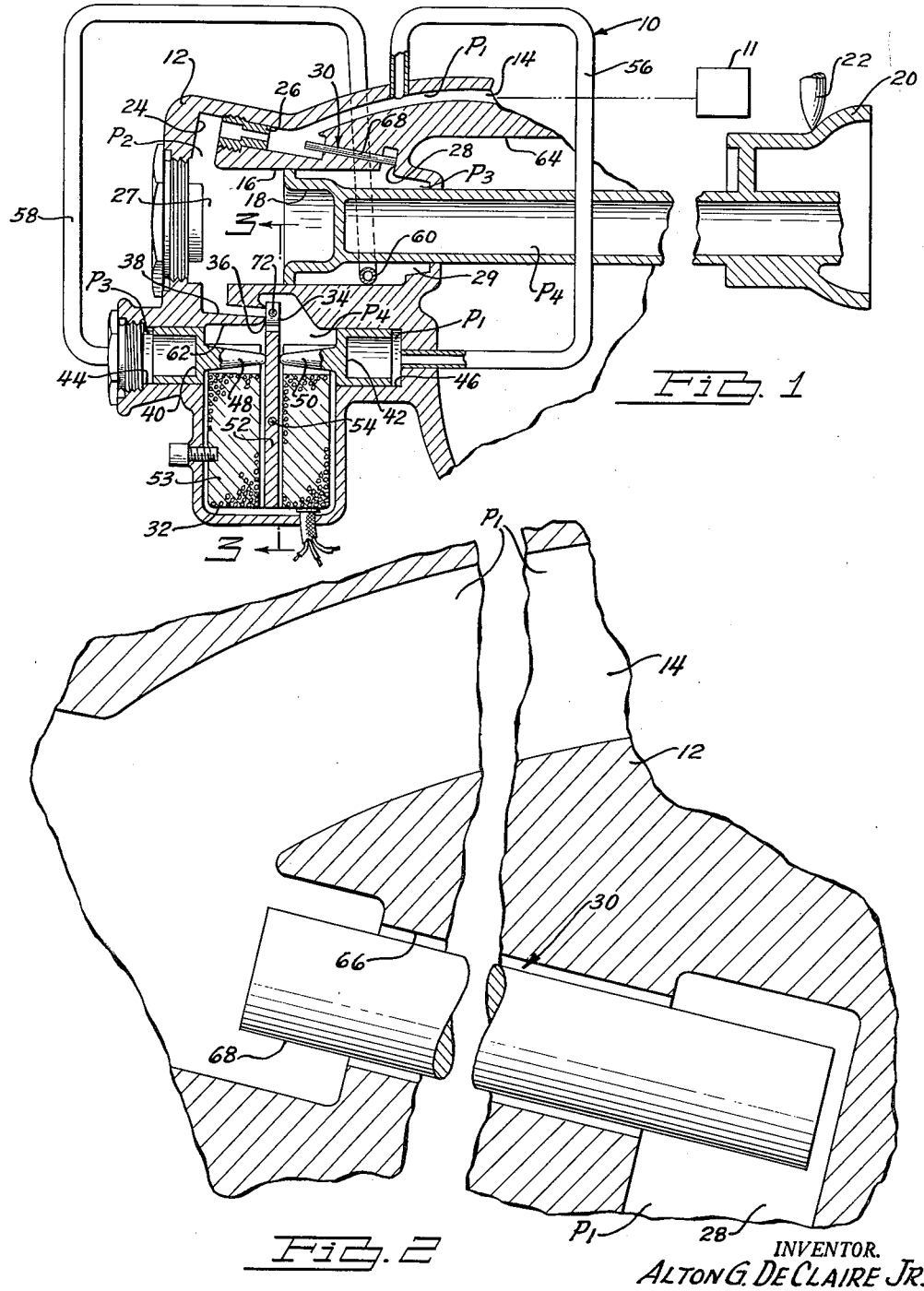

INVENTOR.
ALTON G. DE CLAIRE JR.
BY
Walter Patoroka, Jr.
ATTORNEY

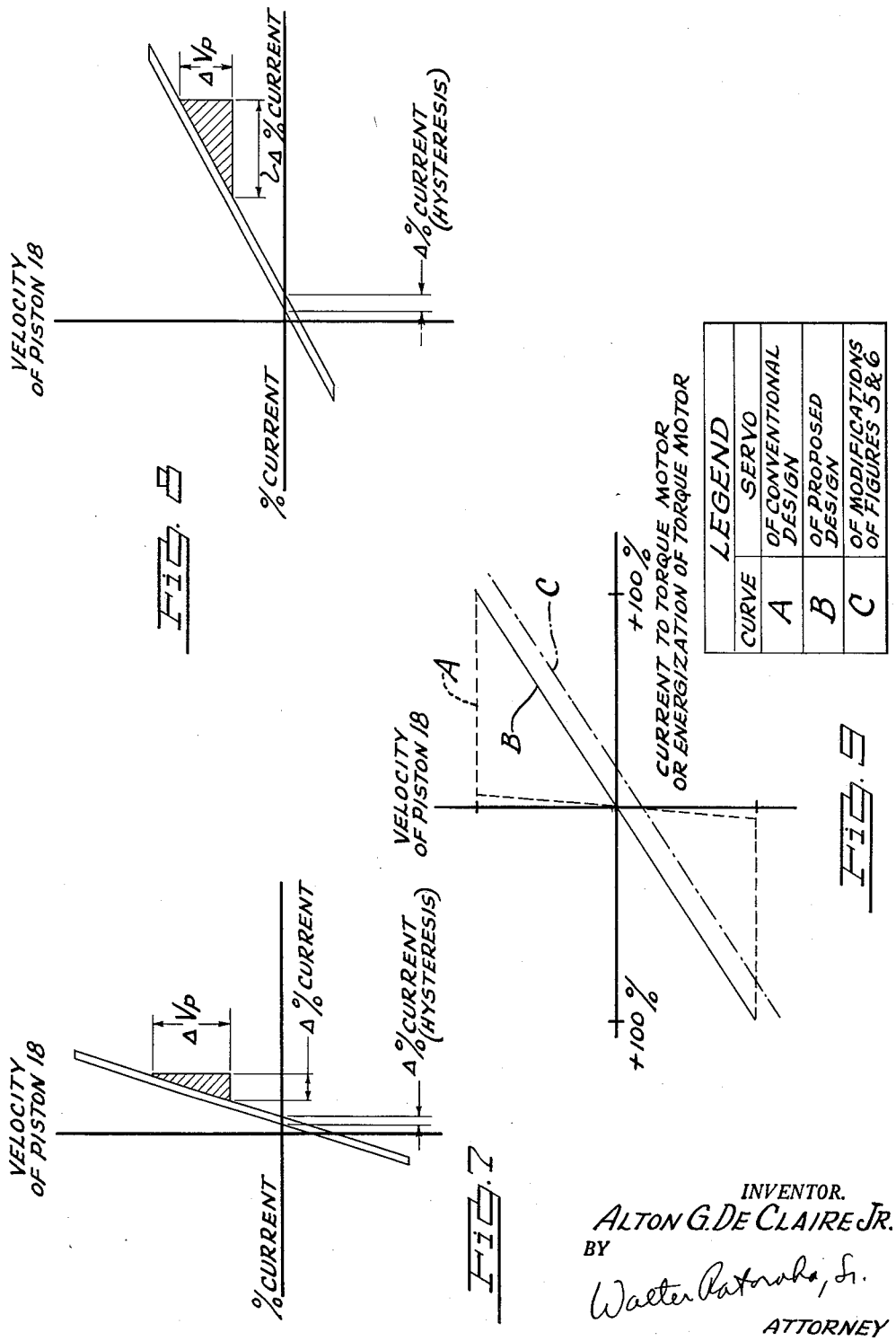

United States Patent Office 2,997,986
Patented Aug. 29, 1961

2,997,986
SERVO SYSTEM
Alton G. De Claire, Jr., Harper Woods, Mich., assignor to Holley Carburetor Company, Van Dyke, Mich., a corporation of Michigan
Filed Nov. 12, 1958, Ser. No. 773,466
8 Claims. (Cl. 121—41)

This invention relates to servo systems, and more particularly to servo systems having slave members actuated in response to some electrical signal.

In many control systems of current design, it has become necessary to actuate a hydraulic servo slave piston in accordance with an electrical input signal, and at the same time to maintain a low gain to the system and to keep the hysteresis to a minimum. However, these two requirements of low gain and low hysteresis are not collectively obtainable according to present practice. For example, a system having a high gain can be made to have a low gain by the conventional practice of introducing a spring constant into the servo system. This would give a lesser slope to the slave velocity curve, and consequently a lower gain; however, the undesirable effect of this solution is that the percentage of hysteresis losses increases and sensitivity of the system is decreased.

Another inherent problem which exits with most conventional designs is that the electrical input is usually proportional to some exterior operating condition, but the servo slave is not aware of this correlation. For example, if a current of 5% of maximum current input is directed to an electric torque motor which controls the position of the servo valve and this current is sufficient to open the servo valve, the slave piston will assume a velocity which approaches or is equal to maximum velocity. This may be acceptable in some designs; however, if the torque motor is capable of receiving a signal of from 0.0% to 100% current input and the slave is to have a velocity in accordance with the electrical signal, then it becomes apparent that a simple servo system employing only a torque motor to control the position of the servo valve is not sufficient.

It is now proposed to provide means whereby a servo system can be made to have a low gain and a low hysteresis.

Another object of the invention is to provide means whereby the servo system will have a low gain and a low hysteresis and the slave piston of the servo system, which is controlled by a torque motor responsive to variable electrical input signals, can be made to have a velocity which is proportional to the variable electrical signals.

Other objects and advantages will become apparent when reference is made to the accompanying specification and illustrations wherein:

FIGURE 1 is a cross-sectional view of the preferred embodiment of the invention.

FIGURE 2 is an enlarged, fragmentary view illustrating in greater detail the laminar flow restriction shown by FIGURE 1.

FIGURE 7 is a graph illustrating the typical gain and hysteresis characteristics of a servo system of conventional design.

FIGURE 8 is a graph illustrating the typical gain and hysteresis characteristics of a conventional servo system having added thereto a spring constant.

FIGURE 9 is a graph illustrating the comparative performances of a servo system of conventional design and the proposed servo systems embodying the invention.

Figure 3:
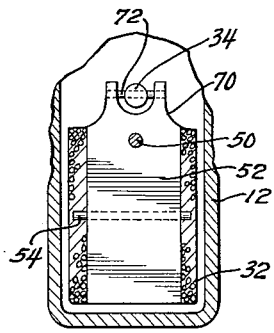
FIGURE 3 is a cross-sectional view taken on the plane of line 3—3 of FIGURE 1, and looking in the direction of the arrows.

Referring now in greater detail to the drawings, FIGURE 1 illustrates a servo mechanism 10 having a housing 12 with a high pressure hydraulic conduit 14 therein communicating with a source of high pressure hydraulic fluid schematically illustrated at 11. A cylindrical cavity 16 formed within housing 12 contains a two diameter slave piston 18 which is connected to some control member such as a cam 20. A cam follower 22 is illustrated to show that the cam 20 has some operative function, the exact details of which are not necessary to the invention. This function will therefore not be described in detail, it being sufficient to say that as the slave piston 18 moves in either direction, the cam 20 will cause the cam follower 22 to rise and fall accordingly and operate some associated mechanism not shown.

Conduit 14 supplies two branch conduits each containing a restriction therein. Conduit 24 having a conventional restriction 26 therein communicates between the high pressure conduit 14 and the chamber 27 formed by the larger face of piston 18 and cavity 16, while conduit 28 which contains a laminar flow restriction 30 communicating between the high pressure conduit 14 and the chamber 29 formed by the smaller face of piston 18 and cavity 16.

An electric torque motor 32 of conventional design and well known in the art (see Control Engineering, August 1958, pp. 74 and 90) is secured in the housing 12 and modified in a manner so as to provide a servo valve 34 which is operative with a coacting seat 36 to control the flow of hydraulic fluid through the conduit 38.

Two pistons 40 and 42, each having equal effective areas, are received by cylindrical cavities 44 and 46, respectively. Projections 48 and 50, which may be either secured to or formed as an integral part of pistons 40 and 42, normally bear against opposite sides of the torque lever 52 which has secured thereto, as illustrated in FIGURE 3, the servo valve 34. The torque lever 52 is suitably pivoted at some point 54 intermediate of its ends so as to rotate in either direction about the pivot 54 in response to electrical input signals to the windings 53.

High pressure $P_1$ is directed to chamber 46 by means of conduit 56 which communicates with the high pressure conduit 14, while a lower pressure $P_3$ is directed to chamber 44 by means of conduit 58 which communicates at a point 60 with chamber 29. The outer surfaces of pistons 40 and 42 may be exposed to some reference pressure $P_4$ which might exist in the cavity 62, a part of the general cavity 64 of the overall control mechanism. It is of course apparent that the exterior surfaces of these pistons do not have to be exposed to any particular pressure; in fact, the system would operate even if the pistons were exposed to a vacuum.

FIGURE 2 illustrates in greater detail the laminar flow restriction 30. It is apparent that, with a proper selection of the relevant variables, such as the relative diameters of conduit 66 and pin 68 and the length of conduit 66, the velocity of flow through restriction 30 is proportional to the pressure differential.

FIGURE 3 illustrates generally the shape of the torque lever 52, which is pivoted at 54 and has a bifurcated portion 70 adapted to pivotally receive the servo valve 34 as by a pin 72.

*Operation*

For purposes of illustration, let it be assumed that the piston 18 and cam 20 have moved to the right to their furthermost position. At that time valve 34 will have been seated or, depending on calibrations etc. of the entire control, almost nearly seated on the coacting servo seat 36. If the valve 34 is entirely seated, pressure $P_2$ in conduit 24 and chamber 27 and pressure $P_3$ in conduit 28 and chamber 29 will be equal to high pressure $P_1$ in conduit 14.

When an electrical current of some magnitude is applied to the torque motor 32, a magnetic flux is created which attracts and causes the torque lever 52 to rotate about some fixed pivot 54. In the illustration used in this disclosure the torque lever will rotate clockwise, causing the valve 34 to raise off seat 36. Since $P_4$ is the lowest of all pressures, the fluid in chamber 27 will flow to the cavities 62 and 64 causing the pressure $P_2$ to drop to some value approaching $P_4$. At the same time pressure $P_3$, due to restriction 30, becomes some value which is less than $P_1$ but greater than $P_2$, thereby causing the piston 18 and cam 20 to move to the left.

It is apparent that the servo valve 34 and coacting seat 36 combine to form an orifice of variable area. Therefore, it is further apparent that the value of $P_2$ will be a function of $P_1$, restriction 26, the reference pressure $P_4$ and the degree to which valve 34 is opened. In any servo system, many of these variables will be of a fixed value and, for purposes of illustration, let it be assumed that the invention as disclosed has pressures $P_1$ and $P_4$ of a fixed value and restriction 26 of a fixed size. Therefore, the only variable affecting the pressure $P_2$, and consequently the motion of piston 18 and cam 20, is the relationship of servo valve 34 to seat 36.

When the torque motor 32 receives an electrical signal in the form of a current input, torque lever arm 52 will lift valve 34 off of seat 36 and allow pressure $P_2$ to tend to go to the reference pressure $P_4$. Piston 18 will start to move to the left allowing chamber 29 to continually go to a pressure $P_3$. The pressure differential $P_1$ to $P_3$ is applied across pistons 42 and 40 by means of conduits 56 and 58, causing a force to be applied to the lever 52 which is proportional to the flow across restriction 30, that is the flow of fluid through the space provided between conduit 66 and pin 68, and directed oppositely to the torque created by motor 32.

The velocity of piston 18 will always be determined by the force due to the initial current signal to motor 32, which force is then biased by an oppositely disposed equal force created by the pressure drop across restriction 30 when the velocity is reached. That is, the degree to which valve 34 is opened varies with the velocity desired, as requested by the current input. For small current inputs, the valve 34 has to be open only a small degree in order to obtain the flow which will allow piston 18 to travel at the desired rate, whereas for maximum current input the valve 32 will have to be fully open in order to obtain maximum velocity of piston 18.

It is apparent that there are various modifications of this invention; some pertain to the hydraulic circuitry, while others deal with changes in the various elements comprising the invention. For example, the following are but a few of the modifications of which this invention is capable of undergoing.

Figure 4:
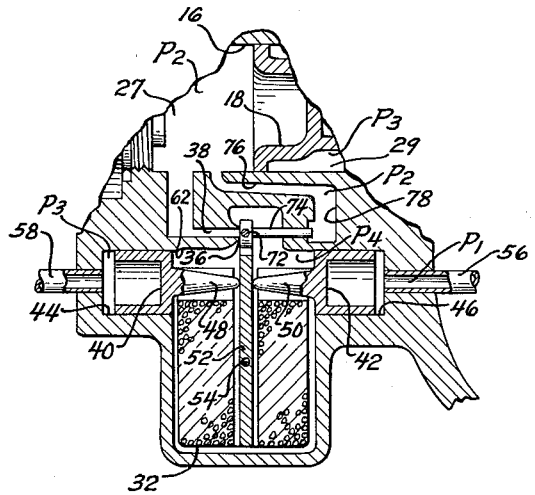
FIGURES 4, 5 and 6 are fragmentary cross-sectional views illustrating various modifications of the invention.

FIGURE 4 illustrates a pin 74 equal in diameter to conduit 38 bearing against the valve 34. The purpose of this pin is to balance the force tending to open the valve 34 due to the differential created by pressures $P_2$ and $P_4$. A conduit 38 communicates between chambers 27 and 78, thereby directing hydraulic pressure equal and opposite to that in conduit 38. This modification of course results in a more sensitive servo valve.

Figure 5:
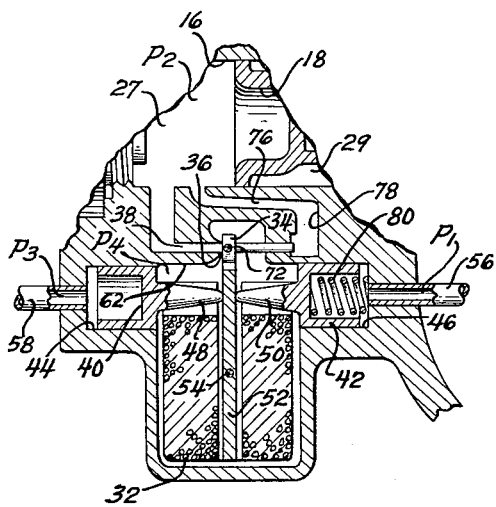

FIGURE 5 illustrates a further modification by employing a spring behind one of the pistons. As illustrated, the spring 80 is placed within chamber 46 urging the piston 42 to the left. This modification enables the performance curves of the piston 18 to be displaced by some value due to the constant introduced by the spring rate and loading thereof.

Figure 6:
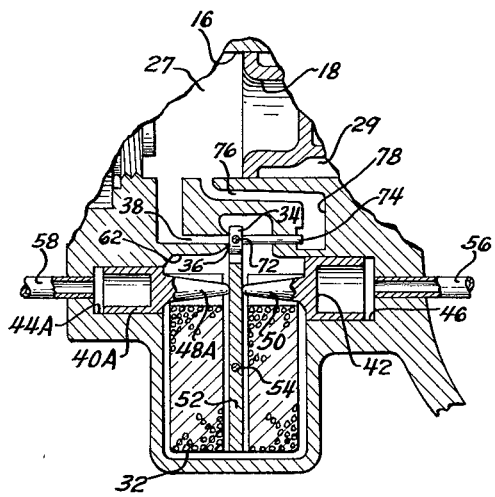

FIGURE 6 illustrates a still further modification wherein the diameters of the pistons are made different in size. For example, chamber 44A and piston 40A could be smaller than chamber 46 and piston 42. The result of this modification is much the same as of that illustrated in FIGURE 5; that is, the performance curve of piston 18 would be displaced by some constant value.

It will be noted that the preferred embodiment and the various modifications of the invention all exhibit the desired characteristics of low gain, low hysteresis and controlled ultimate velocity of the slave piston. It is of course, apparent that the slope of the gain curves can be changed by varying the feed-back piston diameters and/or the size of restriction 30. The slope can be varied in this manner with no sacrifice of sensitivity or increase in hysteresis due to the fact that there is no opposition to the initial opening movement of the servo valve 34 until the piston 18 does move, the force opposing servo valve opening movement is dependent on piston velocity.

Other modifications within the scope of the invention will be apparent to those skilled in the art, and they are claimed as equivalents of the invention to the extent defined by the appended claims.

What I claim as my invention is:

1. In a servo system, a source of high pressure hydraulic fluid, a main conduit for transmitting said fluid, a chamber, a two-diameter piston in said chamber dividing said chamber into first and second distinct and variable chambers, first and second branch conduits communicating between said main conduit and said first and second chambers respectively, hydraulic restrictions in said first and second branch conduits, an electric torque motor, a pilot valve adapted to be moved to the opened and closed positions by said torque motor, a third conduit communicating between said first variable chamber and a reference pressure, said third conduit being so arranged so as to be opened or closed to said reference pressure by the action of said pilot valve, first and second feedback piston means, said first and second feedback pistons being arranged and constructed so as to oppose the movement of said pilot valve, and a fourth and fifth conduit means hydraulically connecting said first and second feedback pistons to said second variable chamber and said main conduit respectively for creating a feedback motivating force proportional to the velocity of said two-diameter piston.

2. In a servo system, a source of high pressure hydraulic fluid, a main conduit for transmitting said fluid, a chamber, a two-diameter piston in said chamber dividing said chamber into first and second distinct and variable chambers, first and second branch conduits communicating between said main conduit and said first and second chambers respectively, a turbulent flow restriction in said first branch conduit, a laminar flow restriction in said second branch conduit, an electric torque motor, a pilot valve adapted to be moved to the opened and closed positions by said torque motor, a third conduit communicating between said first variable chamber and a reference pressure, said third conduit being so arranged so as to be opened or closed to said reference pressure by the action of said pilot valve, a first feedback piston, a second feedback piston having a greater effective area than said first feedback piston, said first and second feedback pistons being arranged and constructed so as to oppose the movement of said pilot valve, and a fourth and fifth conduit means hydraulically connecting said first and second feedback pistons to said second variable chamber and said main conduit respectively for creating a feedback motivating force proportional to the velocity of said two-diameter piston.

3. In a servo system, a source of high pressure hydraulic fluid, a main conduit for transmitting said fluid, a chamber, a two-diameter piston in said chamber dividing said chamber into first and second distinct and variable chambers, first and second branch conduits communicating between said main conduit and said first and second chambers respectively, a turbulent flow restriction in said first branch conduit, a laminar flow restriction in said second branch conduit, an electric torque motor, a hydraulically balanced pilot valve adapted to be moved to the opened and closed positions by said torque motor, a third conduit communicating between said first variable chamber and a reference pressure, said third conduit being so arranged so as to be opened or closed to said reference pressure by the action of said pilot valve, first and second feedback piston means, said first and second feedback pistons being arranged and constructed so as to oppose the movement of said pilot valve, and a fourth and fifth conduit means hydraulically connecting said first and second feedback pistons to said second variable chamber and said main conduit respectively for creating a feedback motivating force proportional to the velocity of said two-diameter piston.

4. In a servo system, a source of high pressure hydraulic fluid, a main conduit for transmitting said fluid, a chamber, a two-diameter piston in said chamber dividing said chamber into first and second distinct and variable chambers, a first and second branch conduits communicating between said main conduit and said first and second chambers respectively, a turbulent flow restriction in said first branch conduit, a laminar flow restriction in said second branch conduit, an electric torque motor, a pilot valve adapted to be moved to the opened and closed positions by said torque motor, a third conduit communicating between said first variable chamber and a reference pressure, said third conduit being so arranged so as to be opened or closed to said reference pressure by the action of said pilot valve, first and second feedback piston means, said first and second feedback pistons being arranged and constructed so as to oppose the movement of said pilot valve, fourth and fifth conduit means hydraulically connecting said first and second feedback pistons to said second variable chamber and said main conduit respectively for creating a feedback motivating force proportional to the velocity of said two-diameter piston, and mechanical means cooperating with said second feedback piston for shifting the equilibrium point of said system.

5. In a variable velocity integrator, pressure responsive means adapted to be influenced by at least two distinct fluid pressures, a pivotally supported moment arm, valve means secured to said moment arm for varying the magnitude of at least one of said distinct fluid pressures, magnetic force generating means positioned in proximity to said moment arm adapted to receive a variable electrical signal and create a magnetic force proportional to said signal tending to rotate said moment arm, and additional means creating a second force which is dependent on the velocity of said pressure responsive means for opposing the movement of said moment arm as caused by said magnetic force generating means.

6. In a variable velocity integrator, piston means adapted to be acted upon by at least two distinct fluid pressures, a pivotally supported moment arm, valve means secured to said moment arm for varying the magnitude of at least one of said distinct fluid pressures, magnetic force generating means adapted to receive an electrical signal and create a magnetic force proportional to said signal for rotating said moment arm, and additional pressure responsive means restricting the rotation of said moment arm to a degree dependent on the velocity of said piston.

7. In a variable velocity integrator, pressure responsive means adapted to be influenced by at least two distinct fluid pressures and capable of two directional movement, a pivoted arm member valve means secured to said arm member for varying the magnitude of at least one of said distinct fluid pressures, means responsive to an electrical input signal and adapted to create a torsional force imparting rotation to said arm member, and resisting means responsive to the velocity of said pressure responsive means for restricting the rotation of said arm member.

8. A servo system, comprising pressure responsive means, conduit means for directing an actuating fluid to said pressure responsive means, a pivotally supported moment arm, valve means operatively connected to said moment arm for varying the magnitude of the pressure of said actuating fluid, means responsive to an electrical input signal for creating a torsional force for imparting rotation to said moment arm, and resisting means responsive to a signal generated in accordance with the velocity of travel of said pressure responsive means for restricting the rotation of said moment arm due to said torsional force creating means.

References Cited in the file of this patent

UNITED STATES PATENTS

| | | |
|---|---|---|
| 1,490,633 | Peters | Apr. 15, 1924 |
| 2,625,136 | Moog | Jan. 13, 1953 |
| 2,790,427 | Carson | Apr. 30, 1957 |
| 2,835,265 | Brandstadter | May 20, 1958 |
| 2,911,991 | Pearl | Nov. 10, 1959 |